United States Patent
Ash et al.

(10) Patent No.: US 7,085,907 B2
(45) Date of Patent: Aug. 1, 2006

(54) DYNAMIC RECONFIGURATION OF MEMORY IN A MULTI-CLUSTER STORAGE CONTROL UNIT

(75) Inventors: Kevin J. Ash, Tucson, AZ (US); Richard H. Grossman, Tucson, AZ (US); Joseph D. Ohrazda, Tucson, AZ (US); Pablo A. Rodriguez, Vail, AZ (US); Tim S. Vande Zande, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 289 days.

(21) Appl. No.: 10/781,467

(22) Filed: Feb. 17, 2004

(65) Prior Publication Data

US 2005/0193240 A1   Sep. 1, 2005

(51) Int. Cl.
*G06F 12/00* (2006.01)
(52) U.S. Cl. .......................... 711/170; 714/7
(58) Field of Classification Search ................ 711/129, 711/170–173, 161–162; 707/200–205; 704/245; 718/104; 714/1–7; 712/228
See application file for complete search history.

(56) References Cited

U.S. PATENT DOCUMENTS

| | | | |
|---|---|---|---|
| 4,704,641 A | 11/1987 | Stohs | |
| 5,301,275 A | 4/1994 | Vanbuskirk | |
| 5,564,011 A | 10/1996 | Yammine | |
| 5,649,093 A | 7/1997 | Hanko | |
| 5,784,698 A | 7/1998 | Brady | |
| 5,897,661 A | 4/1999 | Baranovsky | |
| 5,940,838 A | 8/1999 | Schmuck | |
| 5,940,841 A | 8/1999 | Schmuck | |
| 5,950,199 A | 9/1999 | Schmuck | |
| 5,960,446 A | 9/1999 | Schmuck | |
| 5,987,477 A | 11/1999 | Schmuck | |
| 6,018,515 A | 1/2000 | Sorber | |

(Continued)

FOREIGN PATENT DOCUMENTS

EP  0 932 098 A2   7/1999

(Continued)

OTHER PUBLICATIONS

Iyer and Wolf (1991) IBM Technical Disclosure Bulletin 33:169.

*Primary Examiner*—Nasser Moazzami
(74) *Attorney, Agent, or Firm*—Law Office of Dan Shifrin, PC

(57) ABSTRACT

A data storage control unit is coupled to one or more host devices and to one or more physical storage units, the storage control unit configured as a plurality of clusters. Each cluster includes cache memory and often non-volatile storage (NVS). The storage control unit receives and processes write requests from the host devices and directs that data updates be temporarily stored in the cache in one cluster and copied to the NVS of the other cluster. The data updates are subsequently destaged to the logical ranks associated with each cluster. During an initial microcode load (IML) of the storage controller, space in the cache and NVS of each cluster is allocated to buffers with the remaining cache and NVS space being allocated to customer data. After an IML has been completed, the size of the buffers become fixed and no further buffer allocation may occur. Method, apparatus and program product are provided by which a data storage controller dynamically reconfigures NVS and cache memory in multiple clusters, particularly when it is desired to change the size of the NVS and cache of either or both clusters.

17 Claims, 4 Drawing Sheets

U.S. PATENT DOCUMENTS

| | | |
|---|---|---|
| 6,023,706 A | 2/2000 | Schmuck |
| 6,046,817 A | 4/2000 | Brown |
| 6,094,695 A | 7/2000 | Kornher |
| 6,449,612 B1 | 9/2002 | Bradley |

FOREIGN PATENT DOCUMENTS

| | | |
|---|---|---|
| JP | 4-134523 | 5/1992 |

Cluster 1

| | | |
|---|---|---|
| NVS | Buffers 133A | Customer Data 132 |
| Cache | Buffers 135A | Customer Data 134 |

Cluster 2

| | | |
|---|---|---|
| NVS | Buffers 143A | Customer Data 142 |
| Cache | Buffers 145A | Customer Data 144 |

FIG. 2

Cluster 1

| | | |
|---|---|---|
| NVS | Expanded Buffers 133B | Expanded Customer Data 132 |
| Cache | Expanded Buffers 135B | Expanded Customer Data 134 |

Cluster 2

| | | |
|---|---|---|
| NVS | Buffers 143A | Customer Data 142 |
| Cache | Buffers 145A | Customer Data 144 |

FIG. 3A

Cluster 1

| | | |
|---|---|---|
| NVS | Expanded Buffers 133B | Expanded Customer Data 132 |
| Cache | Expanded Buffers 135B | Expanded Customer Data 134 |

Cluster 2

| | | |
|---|---|---|
| NVS | Expanded Buffers 143B | Expanded Customer Data 142 |
| Cache | Expanded Buffers 145B | Expanded Customer Data 144 |

FIG. 3B

DYNAMIC RECONFIGURATION OF MEMORY IN A MULTI-CLUSTER STORAGE CONTROL UNIT

TECHNICAL FIELD

The present invention relates generally to data storage systems and, in particular, to dynamically reconfiguring NVS and cache buffers in a multi-cluster storage control unit.

BACKGROUND ART

High end storage controllers, such as the International Business Machines Corporation (IBM®) Enterprise Storage Server® manage Input/Output (I/O) requests from networked hosts to one or more storage units, such as a direct access storage device (DASD), Redundant Array of Independent Disks (RAID Array), and Just a Bunch of Disks (JBOD). Storage controllers include one or more host bus adapters or interfaces to communicate with one or more hosts over a network and adapters or interfaces to communicate with the storage units. A storage controller also includes one or more "clusters", each of which includes a cache memory and often a non-volatile storage device (NVS). In a Fast Write operation, the storage controller receives write requests from the host device and writes data updates to the cache of one cluster and subsequently transfers the updates to the NVS of a second cluster. The NVS is used to provide an extra copy of the data update in the event that the copy of the update in cache is lost as a result of a system failure. The storage controller returns a "write complete" message to the host which initiated the update request upon completing the write to both the cache and NVS, but before the data is actually written to the storage unit. The modified cached data of each cluster is subsequently destaged to a target storage unit. Once destaged to disk, the updated copy in the cache and NVS may be removed.

When an initial microcode load (IML) of a storage control unit is performed, the overall sizes of the NVS of both clusters are determined (the storage control unit will be described herein in terms of two clusters although a storage control unit may include only one cluster or more than two clusters). A portion of each NVS is allocated to buffers, the size of which is typically a predetermined amount or proportion of the total NVS available. Thus, an NVS may have, for example, a 1 MB buffer for each 256 MB of NVS memory. Similarly, buffers are allocated out of the usable cache as a local, volatile copy of the NVS buffers. After the NVS and cache buffers are allocated and the IML is completed, the remaining NVS and cache spaces are used for customer data and no further buffer allocation may occur.

When it is desired to change the size of NVS and/or cache memory space of a cluster, a failback-to-service operation is commenced in which the cluster to be updated is removed from service and the controller operated in a single-cluster mode with the other cluster running. NVS and cache may be added or removed from the first cluster which then undergoes an IML and is brought back into service through a failback-to-dual operation. During the single cluster IML, the new sizes of the NVS and cache are recognized. However, the other cluster is not able to accommodate the new sizes because its IML has been completed. One solution is to allocate the maximum size possible for the buffers in both clusters. Such a solution results in wasted space and is unacceptably expensive and inefficient.

Consequently, a need remains for the ability to efficiently and economically allocate NVS and cache buffers in a storage control unit.

SUMMARY OF THE INVENTION

The present invention provides method, apparatus and program product by which a data storage controller dynamically reconfigures NVS and cache memory in multiple clusters. During a dual-cluster IML of the storage controller, the size of the larger of the NVS buffers of the two clusters is determined as is the size of the smaller of the NVS buffers. A portion of each of the caches of the first and second clusters is allocated to a buffer equal in size to the larger NVS buffer. Upon completion of the dual-cluster IML, the NVS buffers and cache buffers of the two clusters are initialized to a size equal to the smaller NVS buffer and the storage control unit is operated in a dual-cluster mode.

A failback-to-service mode is run for the first cluster whose NVS and cache memory are changed. IML of the first cluster is then commenced, after which a portion of the NVS of the first cluster is allocated to an NVS buffer. Another determination is made to obtain the sizes of the larger and smaller of the NVS buffers of the two clusters. A portion of the cache of the first cluster is allocated to a buffer equal in size to the larger NVS buffer and the failback-to-dual mode of the storage control unit is begun. The NVS and cache buffers of both clusters is then initialized to a size equal to the smaller of the two NVS buffers and the storage control unit is operated in the dual-cluster mode.

If desired, a comparable procedure may be performed to also change the amount of NVS and cache memory installed in the second cluster.

BRIEF DESCRIPTION OF THE DRAWINGS

FIG. 2 is a block diagram of NVS and cache memory space before additional memory is added;

FIG. 3A is a block diagram of NVS and cache memory space after additional memory is added to one cluster in a storage control unit;

FIG. 3B is a block diagram of NVS and cache memory space after additional memory is added to the other cluster in a storage control unit;

DETAILED DESCRIPTION OF THE PREFERRED EMBODIMENT

Figure 1:
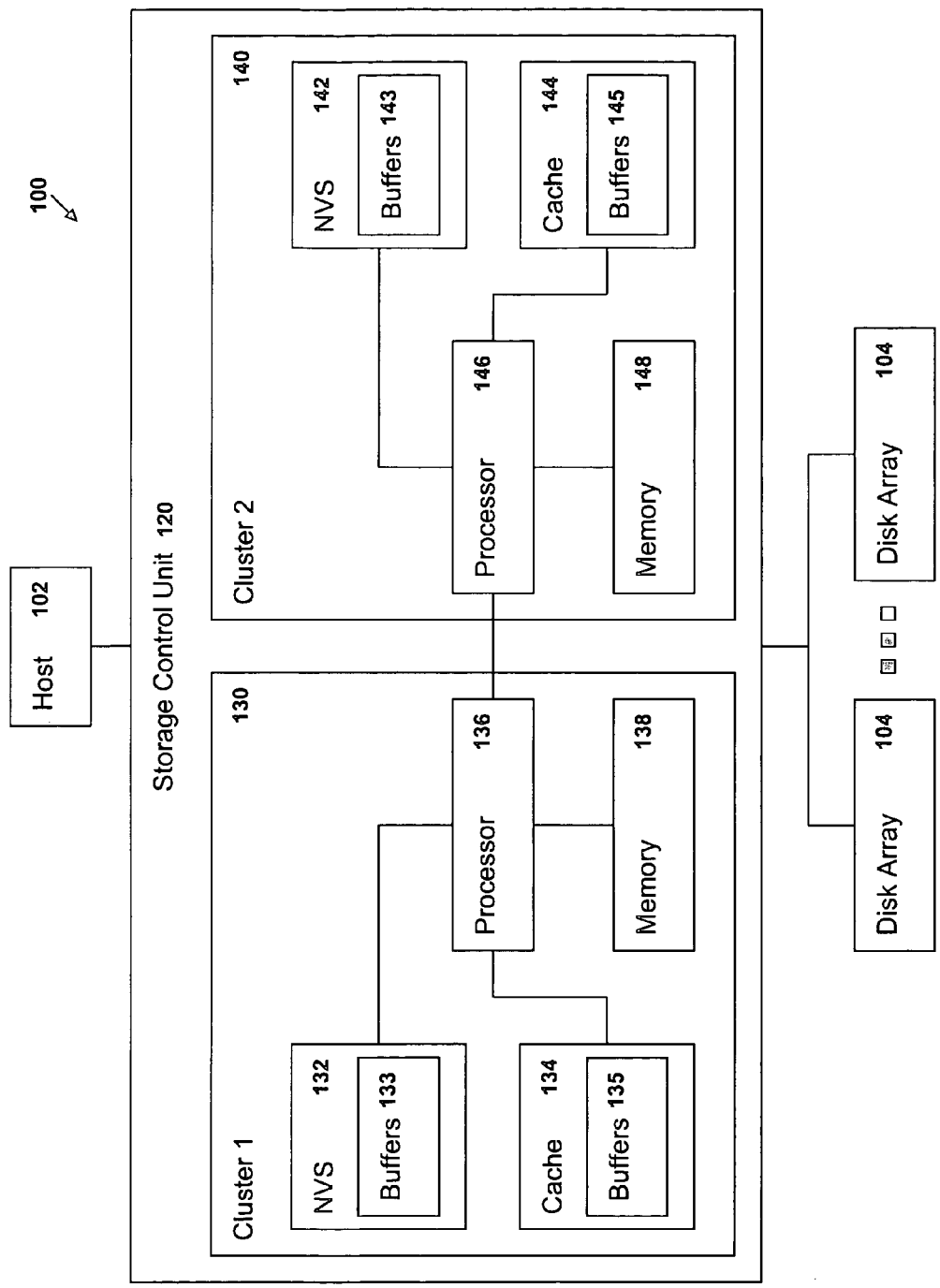
FIG. 1 is a block diagram of a data storage system in which the present invention may be implemented.

FIG. 1 is a block diagram of a data storage system 100 in which the present invention may be implemented. The system 100 includes a storage control unit 120 coupled through appropriate adapters or interfaces to one or more host devices 102 and, also through appropriate adapters or interfaces to one or more physical storage units 104, such as disk storage devices.

The storage control unit (also referred to herein as the "storage controller" or "controller") 120 includes one or more clusters, such as first and second cluster 130 and 140. Each cluster 130 and 140 includes a non-volatile storage memory (NVS) 132 and 142 and temporary storage, such as cache memory 134 and 144, as well as a processor 136 and 146 and operating memory 138 and 148. The processors 136 and 146 are able to communicate with each other and supervise all operations of the respective clusters 130 and 140 by executing instructions stored in the operating memory 138 and 148.

A portion of each NVS memory 132 and 142 is allocated to buffers 133 and 143, respectively. Similarly, a portion of each cache memory 134 and 144 is allocated to buffers 135 and 145, respectively. In the configuration illustrated in FIG. 2 of the NVS and cache of the two clusters, the NVS 132 and cache 134 of the first cluster 130 are of the same size as the NVS 142 and cache 144 of the second cluster 140. The amount of space allocated to buffers may be a predetermined proportion of the total memory (NVS or cache as the case may be), such as 1 MB of buffer space for each 256 MB of total memory. Thus, the amount of the NVS memory allocated to buffers is preferably the same as the amount of the cache memory allocated to buffers, with the balance dedicated to storing customer data. However, it will be appreciated that other configurations of NVS, cache and buffers in the clusters may be implemented.

FIG. 2 is a block diagram of NVS and cache memory space of the two clusters 130 and 140 before memory space is changed. In the Figs., the relative size of the pre-change buffers 133A, 135A, 143A and 145A of the NVS and cache of the first and second clusters 130 and 140 is exaggerated for clarity. Similarly, the relative size of the post-change buffers 133B, 135B, 143B and 145B of the NVS and cache of the first and second clusters 130 and 140 is exaggerated for clarity.

Figure 4:
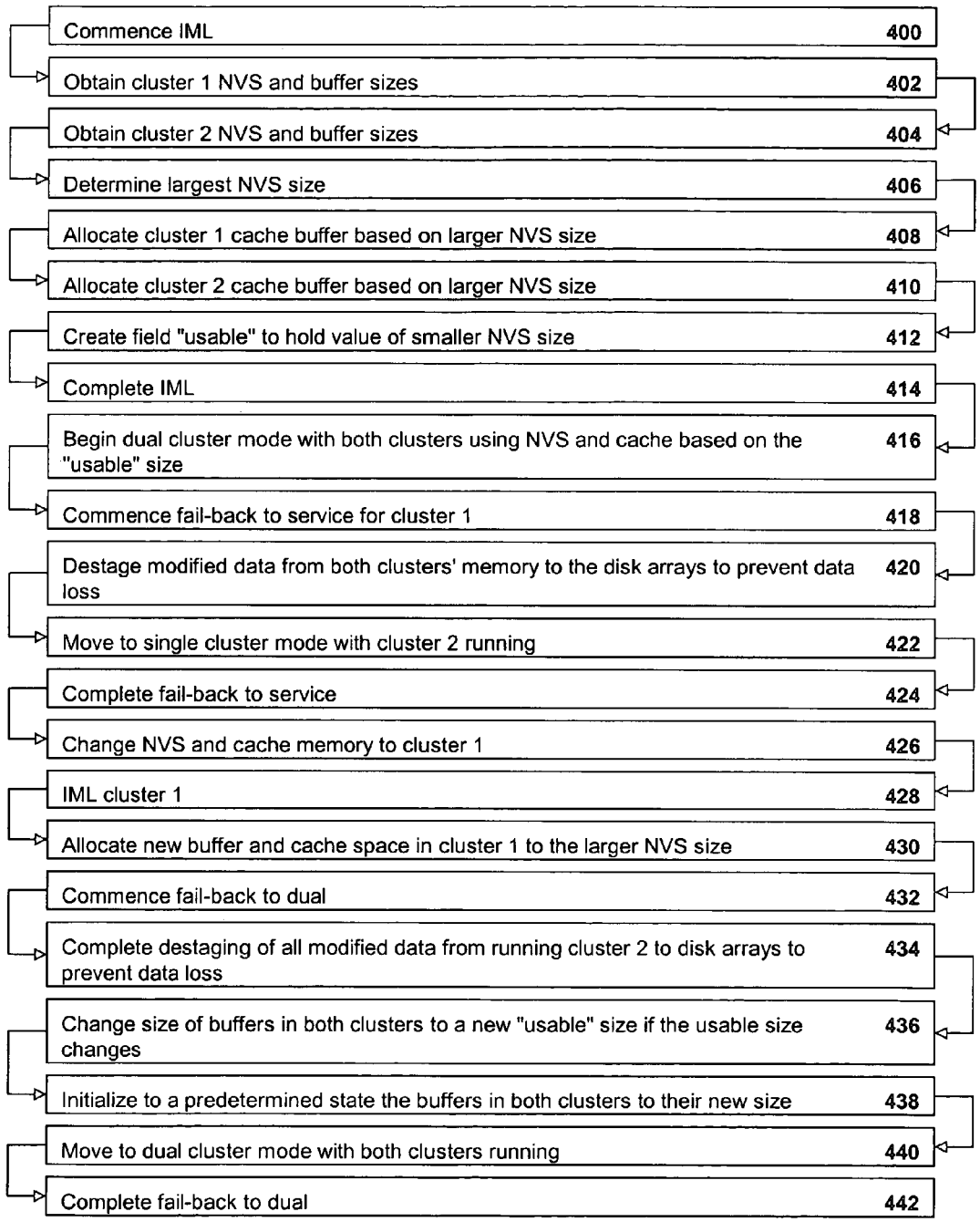
FIG. 4 is a flow chart of one aspect of an implementation of the present invention.

Referring also to the flow charts of FIGS. 4 and 5, the procedure of the present invention will be described. An initial microcode load (IML) of the storage controller 120 begins (step 400) with the processors 136 and 146 executing program instructions stored in the operating memories 138 and 148. The processors 136 and 146 obtain the size of the NVS 132 and 142 and the respective NVS buffers 133A and 143A (steps 402 and 404). Because the first and second clusters 130 and 140 may not have the same amount of NVS installed, the size of the larger NVS 132 or 142 is determined (step 406) and then each cluster allocates to its respective cache buffer 135A and 145A an amount based upon the largest NVS (steps 408 and 410). A determination is also made of the size of the smaller NVS 132 or 142 and a field 'usable' receives this value (step 412). The IML then completes (step 414) and the storage controller 120 begins to operate in a dual-cluster mode (step 416) in which both clusters 130 and 140 use NVS and cache buffers based on the value of the 'usable' parameter.

In order change the size of the NVS and cache of one of the clusters, for example, to increase the size of the NVS 132 and cache 134 in the first cluster 130, the storage controller 120 is placed in a failback-to-service mode (step 418). Modified data stored in both clusters' NVS and cache is destaged to the disk arrays 104 to prevent the possible loss of customer data (step 420). The first cluster 130 is taken offline and the storage controller 120 begins to operate in a single-cluster mode, relying on the second cluster 140 (step 422). The failback-to-service of the first cluster 130 is completed (step 424) and the memory of the first cluster 130 may then be changed (step 426). For example, additional NVS and cache memory may be added as illustrated in FIG. 3A. It will be appreciated, however, that the size of the NVS and cache may be reduced by removing memory instead. After the memory has been installed or removed, an IML of the first cluster 130 commences (step 428) during which new buffer space 133B and 135B (FIG. 3A) is allocated in the NVS 132 and cache 134 based upon the size of the then larger of the NVS 132 or 142 in the first or second clusters 130 and 140 (step 430). The storage controller 120 then commences a failback-to-dual mode (step 432).

Again, modified data is destaged to the disk arrays 104 from the previously solo operating second cluster 140 (step 434). Although the buffers 133B and 135B in the NVS 132 and cache 134 of the first cluster have been allocated to their new, expanded sizes, not all of that space may be usable because the size of the NVS 142 and cache 144 in the second cluster 140 has not also been expanded. Similarly, if memory was removed from the first cluster so that the buffers 133B and 135B are reduced in size, not all of the buffers 143A and 145A in the second cluster 140 may be usable. Consequently, the value of the field 'usable' is updated to reflect the change in memory in the first cluster 130 and the usable size of the buffers 133B, 135B, 143A and 145A in both clusters 130 and 140 is also changed (step 436). All buffers are then initialized to known states (step 438) and the storage control unit 120 may operate in the dual-cluster mode. Finally, the dual cluster mode begins with both clusters operating (step 440) and the failback-to-dual completes (step 442).

Figure 5:
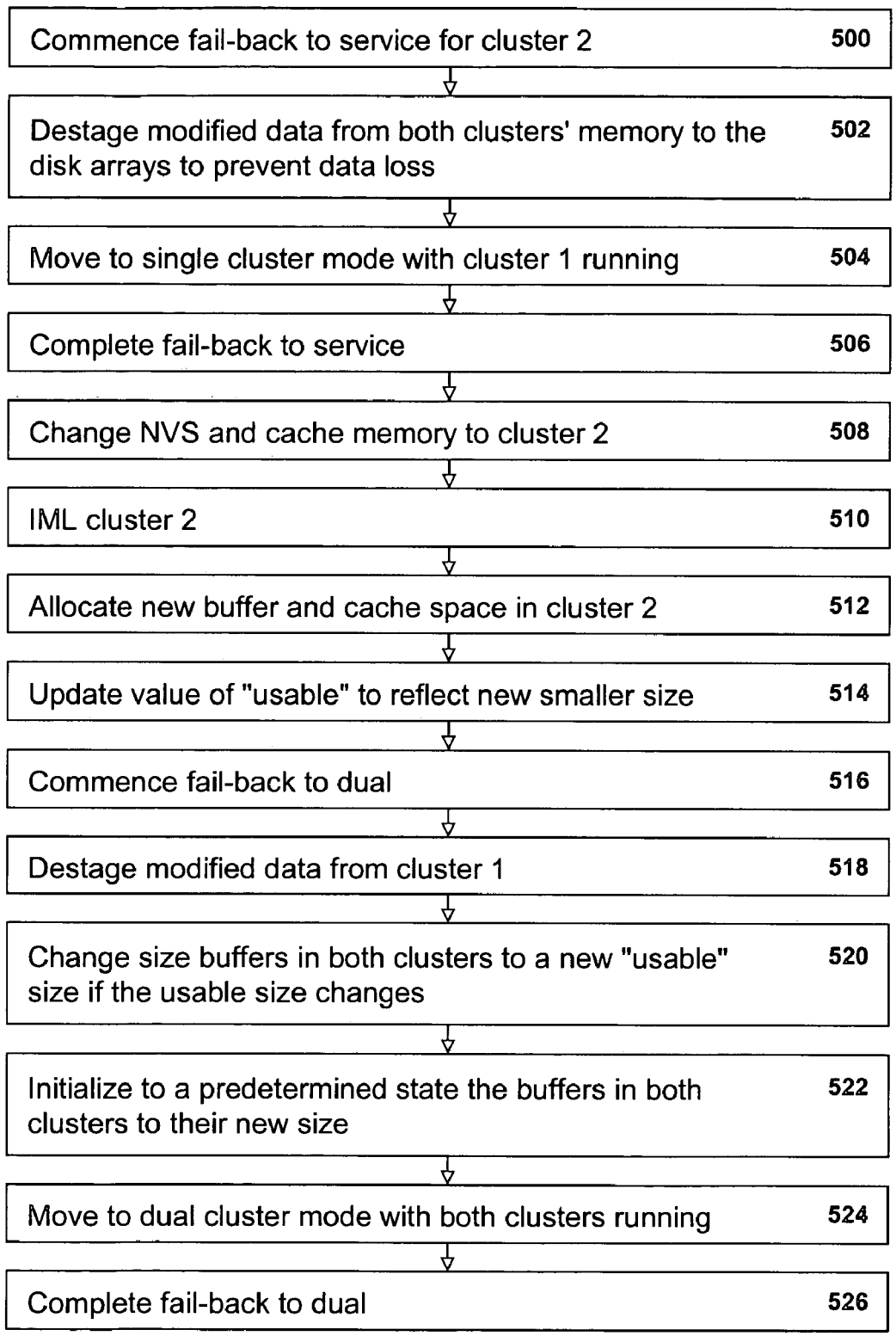
FIG. 5 is a flow chart of another aspect of an implementation of the present invention.

If it is then desired to change the size of the NVS 142 and cache 144 memories in the second cluster 140 to correspond to the new size of the NVS 132 and cache 134 memories in the first cluster 130, the storage control unit 120 commences the failback-to-service mode for the second cluster 140 (FIG. 5, step 500). Modified data stored in both clusters' NVS and cache is destaged to the disk arrays 104 to prevent the possible loss of customer data (step 502). The second cluster 140 is taken offline and the storage controller 120 begins to operate in a single-cluster mode, relying on the first cluster 130 (step 504). The failback-to-service of the second cluster 140 is completed (step 506) and the memory of the second cluster 140 may then be changed (step 508). An IML of the second cluster 140 then commences (step 510) and new buffer space is allocated in the second cluster 140 (step 512) to reflect the new size. The value of the field 'usable' is updated to reflect the change in memory in the second cluster 140 (step 514) and the failback-to-dual mode begins (step 516). Modified data is destaged from the first cluster 140 to the disk arrays 104 (step 518). The usable size of the buffers 133B, 135B, 143B and 145B (FIG. 3B) in both clusters 130 and 140 is also changed (step 520). All buffers are then initialized to the known states (step 522), the storage control unit 120 may operate in the dual-cluster mode (step 524) and the failback-to-dual operation is completed (step 526).

The described techniques may be implemented as a method, apparatus or computer program product using standard programming and/or engineering techniques to produce software, firmware, hardware, or any combination thereof. The computer program product (such as the operating memory 138), as used herein, refers to code or logic implemented in hardware logic (e.g., an integrated circuit chip, Programmable Gate Array (PGA), Application Specific Integrated Circuit (ASIC), etc.) or a computer readable medium (e.g., magnetic storage medium such as hard disk drives, floppy disks, tape), optical storage (e.g., CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed as instructions by a processor. The code in which implementations are made may further be accessible through a transmission media or from a file server over a network. In such cases, the computer program product in which the code is implemented may comprise a transmission media such as network transmission line, wireless transmission media, signals propagating through space, radio waves, infrared signals, etc. Of course, those skilled in the art will recognize that many modifications may be made to this configuration without departing from the scope of the implementations and that the computer program product may comprise any information bearing medium known in the art.

The objects of the invention have been fully realized through the embodiments disclosed herein. Those skilled in the art will appreciate that the various aspects of the invention may be achieved through different embodiments without departing from the essential function of the invention. The particular embodiments are illustrative and not meant to limit the scope of the invention as set forth in the following claims. For example, it will be appreciated that functions described herein as being performed by specific elements of the data storage system 100 may be performed by other elements or by a combination of elements.

What is claimed is:

1. A method of managing memory in a storage control unit including first and second clusters, each cluster including a processor, NVS memory and cache memory, a portion of each of the NVS memory and cache memory of each cluster allocated to buffers, the method comprising:
    commencing a dual-cluster initial microcode load (IML) of the storage control unit;
    determining the size L1 of the NVS buffer of the cluster having the larger NVS buffer;
    allocating a portion of the cache of the first cluster to a buffer equal in size to L1;
    allocating a portion of the cache of the second cluster to a buffer equal in size to L1;
    determining the size S1 of the NVS buffer of the cluster having the smaller NVS buffer;
    completing the dual-cluster IML;
    initializing the NVS buffers and the cache buffers of the first and second clusters to a size equal to S1;
    operating the storage control unit in a dual-cluster mode;
    performing a failback-to-service mode for the first cluster;
    changing the amount of NVS and cache memory installed in the first cluster;
    commencing a single-cluster IML of the first cluster;
    allocating a portion of the NVS of the first cluster to an NVS buffer;
    determining a new size L2 of the NVS buffer of the cluster having the larger NVS buffer;
    allocating a portion of the cache of the first cluster to a buffer equal in size to L2;
    determining the size S2 of the NVS buffer of the cluster having the smaller NVS buffer;
    commencing a failback-to-dual mode of the storage control unit;
    initializing the NVS buffers and the cache buffers of the first and second clusters to a size equal to S2; and
    operating the storage control unit in the dual-cluster mode.

2. The method of claim 1, further comprising:
    performing a failback-to-service mode for the second cluster;
    changing the amount of NVS and cache memory installed in the second cluster;
    commencing a single-cluster IML of the second cluster;
    allocating a portion of the NVS of the second cluster to an NVS buffer;
    determining a new size L3 of the NVS buffer of the cluster having the larger NVS buffer;
    allocating a portion of the cache of the second cluster to a buffer equal in size to L3;
    determining the size S3 of the NVS buffer of the cluster having the smaller NVS buffer;
    commencing a failback-to-dual mode of the storage control unit;
    initializing the NVS buffers and the cache buffers of the first and second clusters to a size equal to S3; and
    operating the storage control unit in the dual-cluster mode.

3. The method of claim 1, further comprising destaging modified data from the NVS and cache of the first and second clusters during the failback-to-service mode.

4. The method of claim 1, further comprising operating the second cluster in a single cluster mode during the failback-to service mode for the first cluster.

5. A storage control unit in a data storage system, comprising:
    a first cluster, comprising:
        a first processor;
        a first NVS memory associated with the first processor and having a portion allocated to a first NVS buffer; and
        a first cache memory associated with the first processor;
    and a second cluster, comprising:
        a second processor coupled to the first processor;
        a second NVS memory associated with the second processor and having a portion allocated to a second NVS buffer; and
        a second cache memory associated with the second processor; the first and second processors programmed for:
    commencing a dual-cluster initial microcode load (IML);
    determining the size L1 of the NVS buffer of the cluster having the larger NVS buffer;
    allocating a portion of the associated cache to a cache buffer equal in size to L1;
    determining the size S1 of the NVS buffer of the cluster having the smaller NVS buffer; and
    completing the dual-cluster IML;
    the first processor further programmed for, following completion of the dual-cluster IML:
        performing a failback-to-service mode for the first cluster;
        identifying a change in the amount of NVS and cache memory installed in the first cluster;
        commencing a single-cluster IML of the first cluster;
        determining a new size L2 of the NVS buffer of the cluster having the larger NVS buffer;
        allocating a portion of the cache of the first cluster to a buffer equal in size to L2;
        determining the size S2 of the NVS buffer of the cluster having the smaller NVS buffer; and
        determining the size S2 of the NVS buffer of the cluster having the smaller NVS buffer; and
    the first and second processors further programmed for, following completion of the failback-to-service of the first cluster:
        operating the storage control unit in a single-cluster mode;
        initializing the NVS buffers and the cache buffers to a size equal to S1; and
        commencing a failback-to-dual mode of the storage control unit;

initializing the NVS buffers and the cache buffers of the first and second clusters to a size equal to S2; and operating the storage control unit in the dual-cluster mode.

6. The data storage unit of claim 5, the second processor further programmed for, following commencement of the dual-cluster mode:

performing a failback-to-service mode for the second cluster;

identifying a change in the amount of NVS and cache memory installed in the second cluster;

commencing a single-cluster IML of the second cluster;

allocating a portion of the NVS of the second cluster to an NVS buffer; determining a new size L3 of the NVS buffer of the cluster having the larger NVS buffer;

allocating a portion of the cache of the second cluster to a buffer equal in size to L3; and determining the size S3 of the NVS buffer of the cluster having the smaller NVS buffer.

7. The data storage unit of claim 6, the first and second processors further programmed for, following completion of the failback-to-service of the second cluster:

commencing a failback-to-dual mode of the storage control unit;

initializing the NVS buffers and the cache buffers of the first and second clusters to a size equal to S3; and operating the storage control unit in the dual-cluster mode.

8. The data storage unit of claim 5, the first and second processors further programmed for destaging modified data from the NVS and cache of the first and second clusters during the failback-to-service mode for a cluster.

9. The method of claim 5, the first and second processors further programmed for operating the second cluster in a single cluster mode during the failback-to service mode for the first cluster.

10. Apparatus for dynamically reconfiguring memory in a storage control unit, comprising:

a first cluster, comprising:
  a first processor;
  a first NVS memory associated with the first processor and having a portion allocated to a first NVS buffer; and
  a first cache memory associated with the first processor; and a second cluster, comprising:
  a second processor coupled to the first processor;
  a second NVS memory associated with the second processor and having a portion allocated to a second NVS buffer; and
  a second cache memory associated with the second processor; and
a memory reconfiguration procedure executed by the first and second processors comprising instructions for:
  performing a dual-cluster initial microcode load (IML);
  determining the size L1 of the NVS buffer of the cluster having the larger NVS buffer;
  allocating a portion of the cache of the first cluster to a buffer equal in size to L1;
  allocating a portion of the cache of the second cluster to a buffer equal in size to L1;
  determining the size S1 of the NVS buffer of the cluster having the smaller NVS buffer;
  initializing the NVS buffers and the cache buffers of the first and second clusters to a size equal to S1;
  operating the apparatus in a dual-cluster mode;
  performing a failback-to-service mode for the first cluster;
  changing the amount of NVS and cache memory installed in the first cluster;
  commencing a single-cluster IML of the first cluster;
  allocating a portion of the NVS of the first cluster to an NVS buffer;
  determining a new size L2 of the NVS buffer of the cluster having the larger NVS buffer;
  allocating a portion of the cache of the first cluster to a buffer equal in size to L2;
  determining the size S2 of the NVS buffer of the cluster having the smaller NVS buffer;
  commencing a failback-to-dual mode of the apparatus;
  initializing the NVS buffers and the cache buffers of the first and second clusters to a size equal to S2; and
  operating the apparatus in the dual-cluster mode.

11. The apparatus of claim 10, the memory reconfiguration process further comprising instructions for:

performing a failback-to-service mode for the second cluster;

changing the amount of NVS and cache memory installed in the second cluster;

commencing a single-cluster IML of the second cluster;

allocating a portion of the NVS of the second cluster to an NVS buffer;

determining a new size L3 of the NVS buffer of the cluster having the larger NVS buffer;

allocating a portion of the cache of the second cluster to a buffer equal in size to L3;

determining the size S3 of the NVS buffer of the cluster having the smaller NVS buffer;

commencing a failback-to-dual mode of the storage control unit;

initializing the NVS buffers and the cache buffers of the first and second clusters to a size equal to S3; and operating the storage control unit in the dual-cluster mode.

12. The apparatus of claim 10, further comprising instructions for destaging modified data from the NVS and cache of the first and second clusters during the failback-to-service mode for a cluster.

13. The apparatus of claim 10, further comprising instructions for operating the second cluster in a single cluster mode during the failback-to service mode for the first cluster.

14. A computer program product of a computer readable medium usable with a programmable computer, the computer program product having computer-readable code embodied therein for dynamically reconfiguring memory in a storage control unit, the computer-readable code comprising instructions for:

commencing a dual-cluster initial microcode load (IML) of the storage control unit;

determining the size L1 of the NVS buffer of the cluster having the larger NVS buffer;

allocating a portion of the cache of the first cluster to a buffer equal in size to L1;

allocating a portion of the cache of the second cluster to a buffer equal in size to L1;

determining the size S1 of the NVS buffer of the cluster having the smaller NVS buffer;

completing the dual-cluster IML;

initializing the NVS buffers and the cache buffers of the first and second clusters to a size equal to S1;

operating the storage control unit in a dual-cluster mode;

performing a failback-to-service mode for the first cluster;

changing the amount of NVS and cache memory installed in the first cluster;

commencing a single-cluster IML of the first cluster;
allocating a portion of the NVS of the first cluster to an NVS buffer; determining a new size L2 of the NVS buffer of the cluster having the larger NVS buffer;
allocating a portion of the cache of the first cluster to a buffer equal in size to L2;
determining the size S2 of the NVS buffer of the cluster having the smaller NVS buffer;
commencing a failback-to-dual mode of the storage control unit;
initializing the NVS buffers and the cache buffers of the first and second clusters to a size equal to S2; and
operating the storage control unit in the dual-cluster mode.

15. The computer program product of claim 14, the instructions further comprising instructions for:
performing a failback-to-service mode for the second cluster;
changing the amount of NVS and cache memory installed in the second cluster;
commencing a single-cluster IML of the second cluster;
allocating a portion of the NVS of the second cluster to an NVS buffer;
determining a new size L3 of the NVS buffer of the cluster having the larger NVS buffer;
allocating a portion of the cache of the second cluster to a buffer equal in size to L3;
determining the size S3 of the NVS buffer of the cluster having the smaller NVS buffer;
commencing a failback-to-dual mode of the storage control unit;
initializing the NVS buffers and the cache buffers of the first and second clusters to a size equal to S3; and
operating the storage control unit in the dual-cluster mode.

16. The computer program product of claim 14, the instructions further comprising instructions for destaging modified data from the NVS and cache of the first and second clusters during commencing a failback-to-service mode for a cluster.

17. The computer program product of claim 14, the instructions further comprising instructions for operating the second cluster in a single cluster mode during the failback-to service mode for the first cluster.

* * * * *